US006788513B2

(12) United States Patent
Kimura

(10) Patent No.: US 6,788,513 B2
(45) Date of Patent: Sep. 7, 2004

(54) SWITCHING POWER SUPPLY CIRCUIT

(75) Inventor: Kazuhito Kimura, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/351,516

(22) Filed: Jan. 27, 2003

(65) Prior Publication Data
US 2003/0141856 A1 Jul. 31, 2003

(30) Foreign Application Priority Data
Jan. 29, 2002 (JP) ........................................ 2002-020019

(51) Int. Cl.[7] .............................................. H02H 3/00
(52) U.S. Cl. ...................................... 361/97; 361/93.9
(58) Field of Search ...................... 361/93.9, 97, 93.1, 361/93.2, 94

(56) References Cited

U.S. PATENT DOCUMENTS 5,485,343 A * 1/1996 Santos et al. ............... 361/115
6,366,068 B1 4/2002 Morishita

FOREIGN PATENT DOCUMENTS

| JP | 05161349 | 6/1993 |
| JP | 10229647 | 8/1998 |
| JP | 2001078439 | 3/2001 |

* cited by examiner

Primary Examiner—Shawn Riley
(74) Attorney, Agent, or Firm—Stevens, Davis, Miller & Mosher, LLP

(57) ABSTRACT

A switching power supply circuit is protected from degradation and breakage of a MOS transistor when the inductive load is short-circuited or overloaded. To do this, the magnitude of the load current flowing through the MOS transistor is detected by a differential amplifier as a voltage drop due to the on resistance of the MOS transistor, a first latch circuit is set by the detection output of the differential amplifier generated when the voltage drop exceeds a predetermined value, and the first latch circuit is reset by the output of a control signal generating circuit controlling the MOS transistor. Current supplies from two constant current sources are switched between in accordance with the output of the first latch circuit to charge and discharge a capacitor for timer time setting. Then, the charging voltage of the capacitor is detected by a comparator, and a second latch circuit is set by the output of the comparator generated when the charging voltage exceeds a predetermined value. Then, the supply of a control signal from the control signal generating circuit to the MOS transistor is inhibited by the output of the second latch circuit.

6 Claims, 3 Drawing Sheets

SWITCHING POWER SUPPLY CIRCUIT

BACKGROUND OF THE INVENTION

1. Field of the Invention

The present invention relates to a switching power supply circuit, and more particularly, to a switching power supply circuit having an overcurrent detecting function and an output short circuit detecting function.

Moreover, the present invention relates to a switching power supply circuit capable of protection against degradation and breakage, due to an overcurrent or a short circuit current, of a switching element and an inductive load circuit and the like fed by the switching element.

2. Description of the Prior Art

In recent years, the need for protection against degradation and breakage of parts under abnormal conditions has been increasing with decrease in voltage and increase in current in semiconductor integrated circuits.

Referring now to FIG. 3, a conventional switching power supply circuit will be described.

The conventional switching power supply circuit comprises as shown in FIG. 3: an error amplifier 18 detecting the voltage at an output terminal Vout; a switching element 19 whose on/off is controlled by the output of the error amplifier 18; a constant current source 20; a capacitor 21 charged by the constant current source 20; a comparator 22 detecting the charging voltage of the capacitor 21; a latch circuit 23 receiving as an input the output signal of the comparator 22; an activating circuit 26 resetting the latch circuit 23; a control signal generating circuit 24; an AND circuit 25 serving as an output drive circuit; a MOS transistor M2 serving as a switching element; a choke coil 29; a Schottky diode 30; resistors 31 and 32 for output voltage detection; and a capacitor 33 for output smoothing. Reference numeral 27 represents a direct-current power supply terminal. Reference numeral 28 represents a direct-current power source. The choke coil 29, the Schottky diode 30, the output voltage detecting resistors 31 and 32 and the output smoothing capacitor 33 constitute an inductive load circuit.

The operation of the switching power supply circuit structured as described above will be described.

Under normal operation conditions, the MOS transistor M2 is switched on and off by a pulse width modulation signal generated by the control signal generating circuit 24 in accordance with the voltage at the output terminal Vout. When the MOS transistor M2 is on, electric power, or energy is supplied from the direct-current power source 28 to the choke coil 29, the capacitor 33 and the output load. At this time, energy is stored in the choke coil 29. When the MOS transistor M2 is switched off by the pulse width modulation signal, a counter electromotive force is caused at the choke coil 29, so that a regenerative current flows through the Schottky diode 30. By smoothing by the capacitor 33 the voltage caused at the choke coil 29 at this time, a direct-current voltage is obtained. The direct-current voltage is output to the output terminal Vout.

The control signal generating circuit 24 generally includes a triangular wave generator (not shown) and an error comparator (not shown). The error comparator monitors the normally output voltage, or the voltage at the output terminal Vout and compares the voltage with the output signal of the triangular wave generator, thereby generating the pulse width modulation signal whose pulse width varies according to the voltage at the output terminal Vout. However, since this is not the essence of the invention, description thereof is omitted.

When the inductive load circuit is overloaded or the output terminal Vout is short-circuited under abnormal conditions, the output voltage detecting error amplifier 18 detects that the potential at the output terminal Vout is decreased, and outputs a high level, thereby switching off the switching element 19. At the same time, the charging of the capacitor 21 is started by the constant current source 20. This operation is maintained during a period for which the voltage at the output terminal Vout is lower than a predetermined voltage and the error amplifier 18 is generating an inversion signal. During this period, the charging of the capacitor 21 is continued, and when a predetermined time determined by the current value of the constant current source 20 and the capacitance value of the capacitor 21 elapses and the charging voltage of the capacitor 21 exceeds a reference voltage Vx of the comparator 22, the comparator 22 sets the latch circuit 23 and switches off the MOS transistor M2. By doing this, the MOS transistor M2 and parts of the inductive load circuit and the like are protected from breakage or degradation.

In the above-described conventional structure, when the output of the switching power supply circuit is overloaded or short-circuited to decrease the voltage at the output terminal Vout, a protection function of causing the MOS transistor M2 to be off for a predetermined period of time works. However, in the overloaded or the short-circuited condition, since no current limitation is imposed, an unlimited overcurrent continuously flows through the MOS transistor M2 and the inductive load circuit, or the choke coil 29, the Schottky diode 30, the resistors 31 and 32 and the capacitor 33 from the start of the timer to the setting of the latch circuit 23. As a result, there is a possibility that the MOS transistor M2 or the inductive load circuit is degraded or broken down.

SUMMARY OF THE INVENTION

An object of the present invention is to provide a switching power supply circuit capable of protecting the switching element and the parts constituting the inductive load circuit with higher reliability.

A switching power supply circuit of the present invention comprises: a direct-current power source; an inductive load circuit supplied with electric power from the direct-current power source; a switching element interrupting the electric power supplied from the direct-current power source to the inductive load circuit; a control signal generating circuit generating a control signal periodically bringing the switching element into conduction; an overload detecting circuit generating an overload detection signal when a load current flowing through the switching element exceeds a predetermined current value; a first latch circuit being set by the overload detection signal and being reset in response to a leading edge of the control signal; a timer circuit performing a clocking operation during a period for which the first latch circuit is set, and generating a time-up signal when a predetermined clocking period elapses; a second latch circuit being set in response to the time-up signal of the timer circuit; and an output drive circuit receiving as inputs the control signal and output signals of the first and the second latch circuits, bringing the switching element into conduction in response to the control signal under normal conditions, and shutting off the switching element irrespective of the control signal when at least one of the first and the second latch circuits is set.

According to this structure, the overload detection signal is generated when the load current flowing through the switching element exceeds the predetermined current value, and at this time, the switching element is shut off irrespective of the presence or absence of the control signal, so that the on period of the switching element is reduced. Consequently, the maximum current value can be limited to not more than a predetermined value. Further, at the time of the occurrence of an abnormal current when the overloaded condition continues, the control of the switching element can be stopped so that the switching element is held in the shut-off condition. Consequently, the protection against degradation and breakage of the switching element and parts of the inductive load circuit can be made more reliable.

In the switching power supply circuit having the above-descried structure, for example, it is preferable that the overload detecting circuit compares an on voltage of the switching element with a predetermined first reference voltage in synchronism with switching on of the switching element to thereby detect that the load current flowing through the switching element exceeds the predetermined current value.

According to this structure, since the overcurrent or the output short circuit current is detected by using the on resistance of the switching element, no special current detecting resistor is necessary. Consequently, only a small number of parts are required, and since there is no power loss at the current detecting resistor, the power source use efficiency never decreases.

In the switching power supply circuit having the above-described structure, for example, the timer circuit comprises: a capacitor; charging means for passing a charging current through the capacitor during the period for which the first latch circuit is set; discharging means for passing a discharging current through the capacitor during a period for which the first latch circuit is reset; and a comparator comparing a charging voltage of the capacitor with a predetermined second reference voltage and outputting the time-up signal when the charging voltage of the capacitor exceeds the second reference voltage.

According to this structure, when it is detected that the load current of the switching element becomes an overcurrent, that is, that the switching element is in the overloaded condition, the charging of the capacitor is started, and the clocking operation is performed while the succeeding charging and discharging of the capacitor are repeated, so that the time-up period that lasts until the charging voltage of the capacitor reaches the second reference voltage is longer than that of the conventional example. Consequently, the capacitance value of the capacitor can be made lower that that of the conventional structure. That is, the time-up period can be made long although the capacitance value of the capacitor is low. Consequently, the capacitor can be formed so as to be small, and this enables the timer circuit including the capacitor to be integrated into a semiconductor integrated circuit.

Moreover, it is preferable that in the timer circuit comprising the capacitor, the charging means, the discharging means and the comparator, a level of the second reference voltage is set so that a period from start of a charging and a discharging operation to generation of the time-up signal, that is, a time-up period is not less than twice a period of the control signal. Further, it is more preferable that the period is three to five times a period of the control signal According to this structure, even when the capacitor is charged as a result of a one-shot noise intruding from a peripheral circuit or a peripheral apparatus to cause the first latch circuit to malfunction, the discharging means functions to discharge the capacitor so that the charging voltage decreases. Consequently, even when a one-shot noise intrudes from a peripheral circuit or a peripheral apparatus, it is avoided that the operation of the switching element is stopped by a malfunction due to the noise, so that a highly reliable overcurrent detecting operation can be performed.

Moreover, it is preferable that in a switching power supply circuit comprising the timer circuit comprising the capacitor, the charging means, the discharging means and the comparator, the following are further provided: an activating circuit a period of generation of which output signal is set to a period longer than a period of the control signal; and short-circuiting means for short-circuiting across the capacitor in response to the setting of the second latch circuit, and the second latch circuit is periodically reset by an activation signal of the activating circuit.

According to this structure, when an operator in charge of operating an electronic apparatus provided with the switching power supply circuit of the present invention makes a mistake in the operation of the apparatus to short-circuit the inductive load circuit, not only the overloaded condition is detected and the switching element is shut off to thereby protect the circuit but also the shut-off condition can be periodically canceled. Consequently, by the operator eliminating the short-circuited condition, the overcurrent detection operation for causing the protection operation to function is resumed and the primary function of the switching power supply circuit can be delivered.

DESCRIPTION OF THE PREFERRED EMBODIMENT

An embodiment of the present invention will be described with reference to the drawings.

Figure 1:
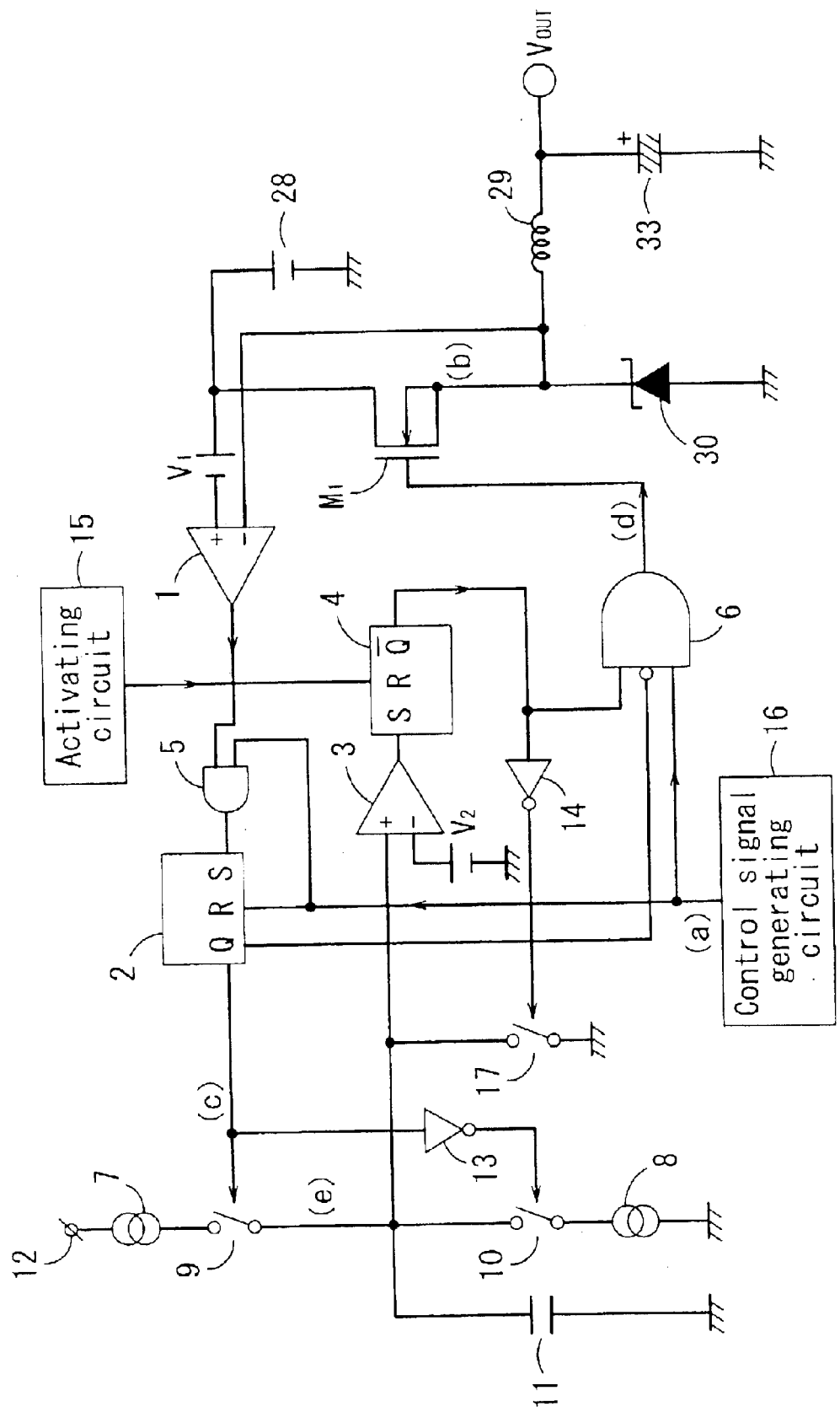
FIG. 1 is a circuit diagram showing the structure of a switching power supply circuit according to an embodiment of the present invention.

FIG. 1 shows the structure of a switching power supply circuit according to the embodiment of the present invention.

In FIG. 1, reference designation M1 represents a MOS transistor as an example of a switching element supplying electric power to an inductive load circuit.

Reference numeral 1 represents a differential amplifier detecting the voltage across the MOS transistor M1.

Reference numeral 2 represents a latch circuit being set by receiving the output signal of the differential amplifier 1.

Reference numeral 3 represents a comparator. Reference numeral 4 represents a latch circuit being set by receiving the output of the comparator 3.

Reference numerals 5 and 6 represent AND circuits.

Reference numerals 7 and 8 represent constant current sources.

Reference numerals 9 and 10 represent switching elements.

Reference numeral 11 represents a capacitor for timer time setting. Reference numeral 12 represents a direct-current power supply terminal.

Reference numerals 13 and 14 represent inverter circuits.

Reference numeral 15 represents an activating circuit resetting the latch circuit 4.

Reference numeral 16 represents a control signal generating circuit.

Reference numeral 17 represents a switching element as short-circuiting means.

Reference numeral 28 represents a direct-current power source supplying electric power.

Reference numeral 29 represents a choke coil.

Reference numeral 30 represents a Schottky diode.

Reference numeral 33 represents a capacitor for smoothing.

Reference designation Vout represents an output terminal outputting a smoothed direct-current output voltage.

The choke coil 29, the Schottky diode 30 and the capacitor 33 constitute an inductive load circuit for the MOS transistor M1. This inductive load circuit is supplied with electric power by the direct-current power source 28. The supply of the electric power is interrupted by the MOS transistor M1. When the MOS transistor M1 performs the interrupting operation, an induced voltage occurs across the choke coil 29. The induced voltage is converted into a direct-current output voltage by being smoothed by the capacitor 33, and the direct-current output voltage is output from the output terminal Vout.

The control signal generating circuit 16 generates a control signal for periodically bringing the MOS transistor M1 into conduction, specifically, a pulse width modulation signal. Under normal operation conditions, this control signal is applied to the gate of the MOS transistor M1 through the AND circuit 6 serving as the output drive circuit, thereby controlling the on/off, or the switching of the MOS transistor M1.

The AND circuit 6 serving as the output drive circuit receives as inputs the control signal output from the control signal generating circuit 16 and the output signals of the first and the second latch circuits 2 and 4. With this, in normal times, the MOS transistor M1 is brought into conduction in accordance with the control signal output from the control signal generating circuit 16, and when at least one of the first and the second latch circuits 2 and 4 is set, the MOS transistor M1 is shut off irrespective of the control signal.

The MOS transistor M1 shown in FIG. 1 is connected, specifically, as being an N-channel MOS transistor. That is, FIG. 1 shows a circuit example in which the drain of the MOS transistor M1 is connected to the direct-current power source 28, the gate thereof is connected to the output of the AND circuit 6 and the inductive load circuit is driven as a source follower type. It is considered that the MOS transistor M1, or the N-channel MOS transistor is brought into complete conduction when a high level is input from the AND circuit 6.

When the degree of conduction of the N-channel MOS transistor is low, the AND circuit 6 is operated at a power supply voltage increased by a bootstrap circuit (not shown) to thereby increase the amplitude of the control signal applied to the gate.

As the MOS transistor M1, a P-channel MOS transistor is also usable. In that case, the source of the MOS transistor M1 is connected to the direct-current power source 28, an inverter circuit (not shown) is provided at the output end of the AND circuit 6, the inversion signal of the output signal of the AND circuit 6 is applied to the gate, and the inductive load is driven as a source grounded type.

The minimum function as a switching power supply circuit is implemented by the control signal generating circuit 16, the MOS transistor M1, the Schottky diode 30, the choke coil 29 and the capacitor 33. That is, when the MOS transistor M1 is brought into conduction in accordance with the pulse width of the control signal output from the control signal generating circuit 16, energy is stored in the choke coil 29 by the conduction operation, and the induced voltage induced by the choke coil 29 is converted into a direct-current output voltage by being smoothed by the capacitor 33. Since this direct-current output voltage varies according to the pulse width, a predetermined direct-current output voltage can be output by controlling the switching of the MOS transistor M1 with a predetermined pulse width.

However, since the direct-current output voltage tends to vary also by variations in load current, when it is intended to stabilize the direct-current output voltage against load variations, an error comparator (not shown) performing error comparison between the voltage at the output terminal Vout and a reference voltage is provided, a feedback path for feeding back the error comparison output of the error comparator to the control signal generating circuit 16 is formed, and the pulse width of the control signal is varied according to the output of the error comparator. By doing this, the direct-current output voltage can be stabilized.

An overload detecting circuit comprises: the differential amplifier 1 comparing the on voltage of the MOS transistor M1 with a first reference voltage generated from a reference voltage generator V1; and the AND circuit 5 receiving as inputs the output of the differential amplifier 1 and the control signal of the control signal generating circuit 16.

Now, a current detecting method using the on resistance of the MOS transistor will be described. When the MOS transistor is brought into complete conduction, the impedance between the drain and the source of the MOS transistor exhibits a characteristic substantially equal to a resistor, and when the drain current increases, the drain-source voltage (on voltage) increases substantially in proportion thereto. Therefore, if the on voltage can be detected in synchronism with the switching on of the MOS transistor, the current flowing through the MOS transistor can be detected.

Conventionally, to precisely detect the operating current of a switching element, a pure resistor is connected in series to the MOS transistor M1 and the voltage across the resistor is detected being converted into a current value. Compared to this conventional current detecting method, in the current detecting means used by the present invention, that is, the current detection by the on resistance of the MOS transistor, although the current detection precision is inferior, no problem is caused in uses such as the detection of the overloaded condition or the short circuit condition of the output. The overload detecting circuit utilizing the above-described current detecting method will be described.

In the overload detecting circuit, the AND circuit 5 is connected to the output end of the differential amplifier 1. Since the MOS transistor M1 is conducting when the control signal is high, the output signal from the differential amplifier 1 is made effective only when the control signal which is high is input to the input of the AND circuit 5. With this, the on voltage of the MOS transistor M1 is compared with the first reference voltage of the reference voltage generator V1 by the differential amplifier 1 in synchronism with the switching on of the MOS transistor M1. The differential amplifier 1 generates an output signal, or an overcurrent detection signal when the load current flowing through the MOS transistor M1 exceeds a predetermined current value. With this overload detecting circuit, since no special current detecting resistor is necessary, only a small number of parts are required and since there is no power loss at the current detecting resistor, the power source use efficiency never decreases.

The first latch circuit 2 is set by an overcurrent detection signal which is the output signal of the AND circuit 5, is reset in response to the leading edge of the control signal of the control signal generating circuit 16, in this example, the rising edge of the control signal, and controls the circuit operation of the timer circuit by its own Q output. While the control signal generating circuit 16 is designed based on the positive logic where the high level is effective, when it is designed based on the negative logic where low level is effective, the leading edge of the control signal is the falling edge of the control signal.

The timer circuit comprises the constant current sources 7 and 8, the timer time setting capacitor 11, the switching elements 9 and 10, the inverter circuit 13 and the comparator 3.

The constant current source 7 and the switching element 9 constitute charging means for passing a charging current through the capacitor 11, and each comprise a transistor. The transistor constituting the constant current source 7 is capable of driving the switching of its own constant current operation. Shutting off a transistor constituting the constant current circuit 8 in accordance with the Q output of the latch circuit 2 makes it unnecessary to provide the switching element 9.

The constant current source 8 and the switching element 10 constitute discharging means for passing a discharging current through the capacitor 11, and each comprise a transistor. Driving the switching of the transistor constituting the constant current source 8 and shutting off the transistor in accordance with the output of the inverter circuit 13 makes it unnecessary to provide the switching element 10.

Since the switching element 9 is brought into conduction in accordance with the Q output of the latch circuit 2 and the switching element 10 is brought into conduction in accordance with the inversion signal of the Q output of the latch circuit 2 produced by the inverter circuit 13, when the charging means functions, the discharging means is shut off, and when the discharging means functions, the charging means is shut off.

Now, the relationship between the set value of the discharging current and the set value of the charging current will be described. To reduce the capacitance value of the capacitor 11, the level of the discharging current is set to be the same as or not more than twice that of the charging current. However, since the impedance of the capacitor 11 increases, the circuit is susceptible to noises that come flying, and the comparator 3 tends to malfunction. When the reliability of the circuit operation is emphasized, the value of the discharging current is set to a value between zero and half the charging current and the capacitance value of the capacitor 11 is set to a rather high value.

In the charging and the discharging means constituted by the constant current sources 7 and 8 and the switching elements 9 and 10, that is, the charging means and the discharging means, when the latch circuit 2 is set by the overcurrent detection signal, the switching element 9 operating on the Q output of the latch circuit 2 is brought into conduction, and a charging operation of passing the charging current through the capacitor 11 is performed. When the latch circuit 2 is reset by the control signal of the control signal generating circuit 16, the switching element 10 operating on the output of the inverter circuit 13 is brought into conduction, and a discharging operation of passing the discharging current through the capacitor 11 is performed.

Since the timer circuit performs a clocking operation of gradually charging the capacitor 11 while repeating the charging operation and the discharging operation, a time-up period that lasts until the charging voltage reaches a second reference voltage V2 is longer than that of the conventional structure, so that the capacitance value of the capacitor 11 can be reduced. Consequently, the capacitor 11 can be formed so as to be small, and this enables the timer circuit including the capacitor 11 to be integrated into a semiconductor integrated circuit.

The comparator 3 constituting part of the timer circuit compares the charging voltage of the capacitor 11 with the output voltage of the reference voltage generator V2, or the second reference voltage, and when the charging voltage of the capacitor 11 exceeds the second reference voltage, outputs a time-up signal, or a high-level output voltage.

The level of the second reference voltage of the reference voltage generator V2 is set so that the period from the start of the charging and the discharging operations by the charging and discharging means to the generation of the time-up signal, or the time-up period is not less than twice, preferably, three to five times the period of the control signal of the control signal generating circuit 16. By doing this, the time-up signal is not generated when the MOS transistor M1 brought into conduction in accordance with the control signal of the control signal generating circuit 16 is switched on only once, but is generated only when the MOS transistor M1 is continuously switched on several times.

Generally, it is highly likely that noises intrude from peripheral circuits and peripheral apparatuses into switching power supply circuits provided in various electronic apparatuses and in various places in electronic apparatuses. However, with the timer circuit having the above-described structure, even if the first latch circuit 2 malfunctions due to a one-shot noise and the capacitor 11 is charged by mistake, since by the latch circuit 2 being reset by the next control signal, the discharging means functions to discharge the charges in the capacitor 11 and decrease the charging voltage, the time-up signal is never output by one-shot noises, so that such malfunctions as to stop the operation of the MOS transistor can be avoided. Consequently, highly reliable overcurrent detection can be performed.

Now, the ground for the above-described setting of the time-up period will be described. Malfunctions due to one-shot noises that come flying from peripheral apparatuses can be avoided by setting the time-up period so as not to end after a single charging operation. To do this, the time-up period is set so as to be not less than twice the period of the control signal. When the time-up period is long, measures can be taken against malfunctions even when one-shot noises are intensively caused, and the longer the time-up period is, the more reliable the circuit operation is. However, when the time-up period is long, the protection function starts to operate late, which is undesirable. The practical time-up period is three to five times the period of the control signal.

Next, the circuit operation, particularly, the overcurrent detecting operation of the switching power supply circuit structured as described above will be described in detail with reference to the timing chart shown in FIG. 2.

Figure 2:
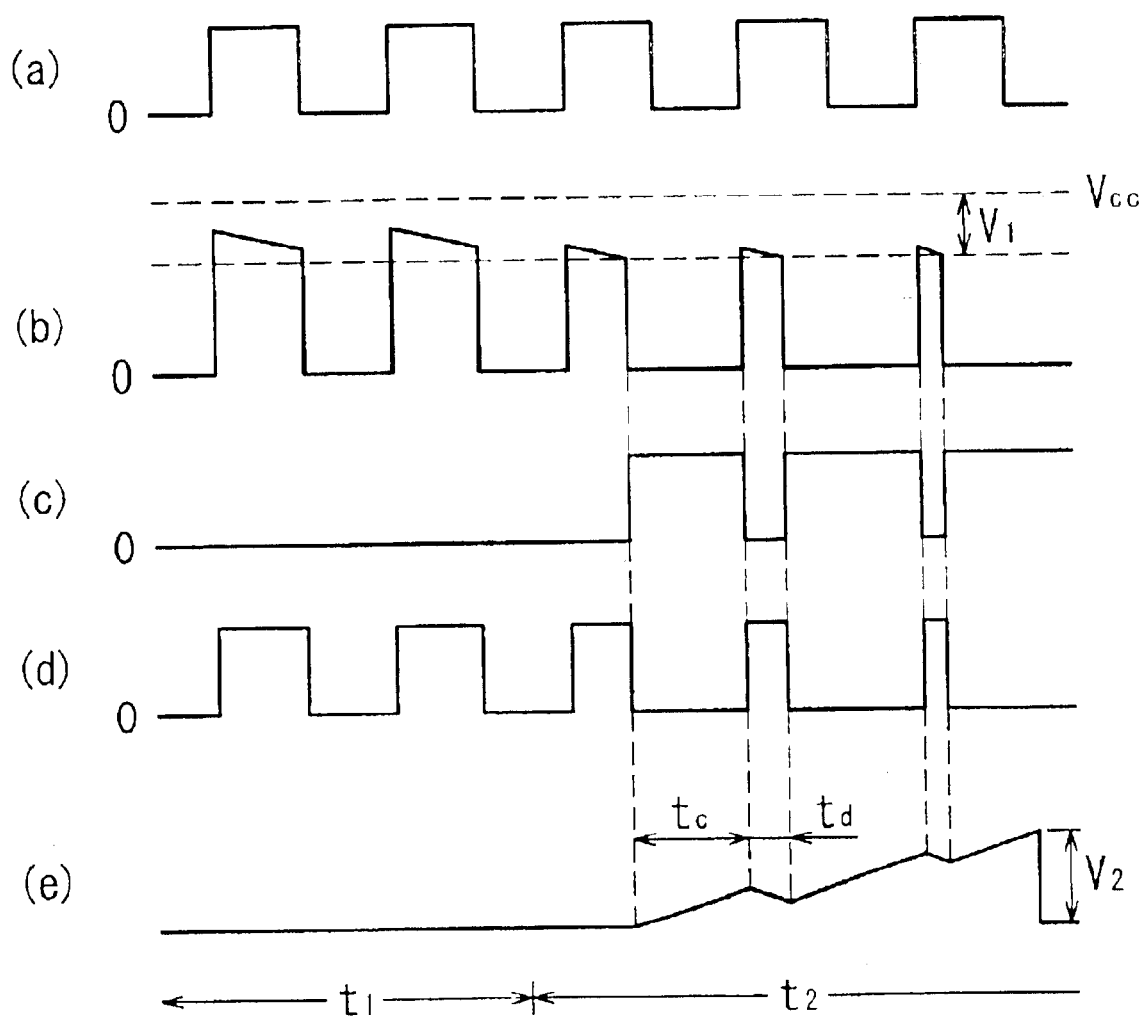
FIG. 2 is a timing chart showing the operation timing of the switching power supply circuit according to the embodiment of the present invention.
Figure 3:
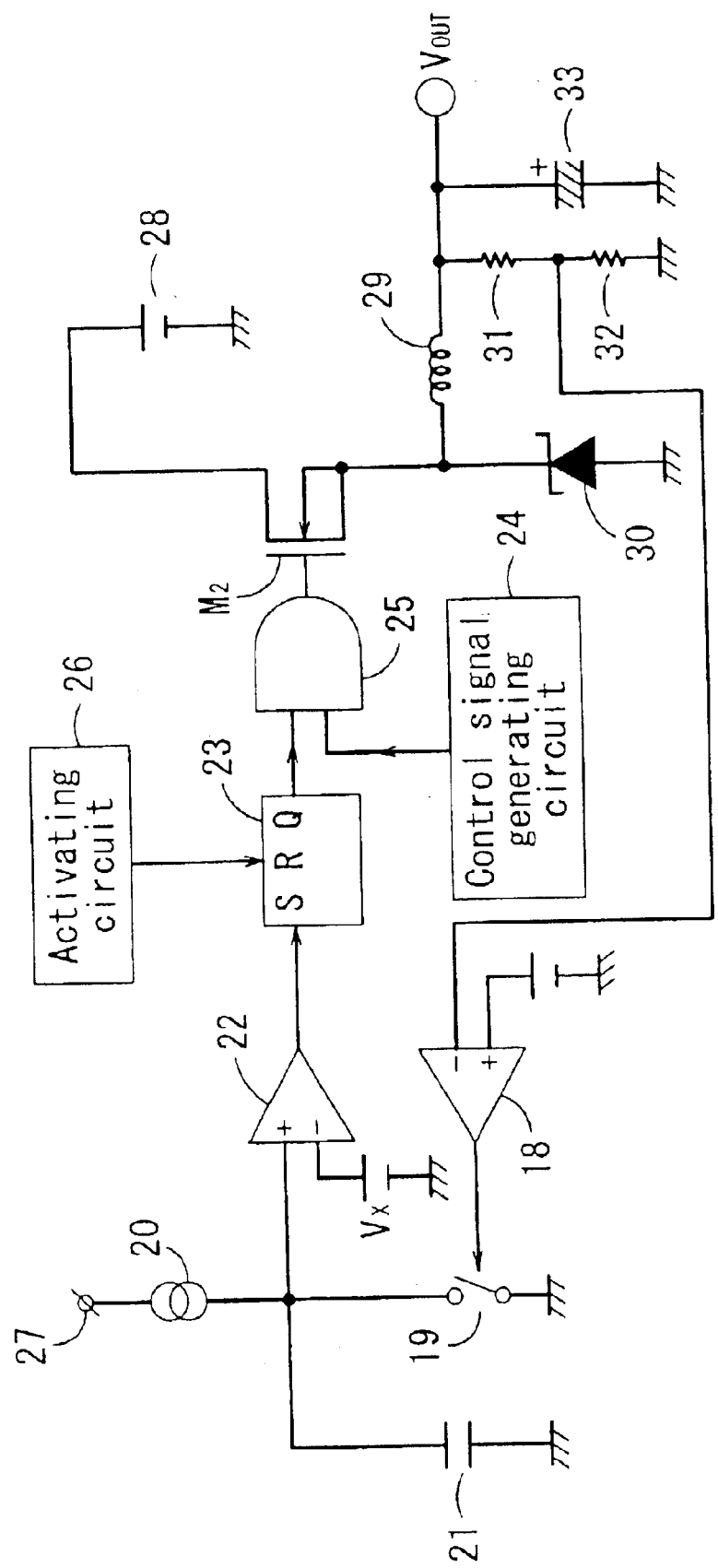
FIG. 3 is a circuit diagram showing the structure of the conventional switching power supply circuit.

FIG. 2 is a timing chart showing, with the horizontal axis as time, operating waveforms of the parts represented by (a) to (e) in FIG. 1. The waveform (a) of FIG. 2 shows the control signal (pulse width modulation signal) generated by the control signal generating circuit 16. The waveform (b) of FIG. 2 shows the terminal voltage of the MOS transistor M1. The waveform (c) of FIG. 2 is the output voltage of the Q output of the first latch circuit 2. The waveform (d) of FIG. 2 is the output voltage of the AND circuit 6 which is the output drive circuit. The waveform (e) of FIG. 2 shows the terminal voltage of the capacitor 11.

In FIG. 2, a first period t1 shows the waveforms under normal operation conditions, that is, conditions where the circuit is operating on a load current of a normal level. During the period t1, a waveform the same as the control signal of the control signal generating circuit 16 shown by the waveform (a) is output as the waveform (d) from the output terminal of the AND circuit 6. When the control signal shown by the waveform (a) is high, the MOS transistor M1 is on, and the terminal voltage of the MOS transistor M1 at this time is of a high level which is slightly lower in potential than a power supply voltage Vcc as shown by the waveform (b). The waveforms of the high-level parts of the terminal voltage shown by the waveform (b) decline toward the right because of an influence of the counter electromotive force caused when the inductive load circuit is switched.

Although the terminal voltage of the MOS transistor M1 shown by the waveform (b) is compared by the differential amplifier 1 with a reference potential lower than the power supply voltage Vcc by approximately the first reference voltage of the reference voltage generator V1, since this terminal voltage does not decrease to the reference potential, the overcurrent detection signal is not output from the overload detecting circuit including the differential amplifier 1. Therefore, the latch circuit 2 is held being reset, and a low-level voltage is output from the Q output of the latch circuit 2 shown by the waveform (c). For this reason, the succeeding timer circuit does not operate, and the charging of the capacitor 11 is not performed. Consequently, the terminal voltage of the capacitor 11 is held low as shown by the waveform (e).

A second period t2 in FIG. 2 shows the waveforms in an overloaded condition, that is, a condition where the load current is excessive. During the period t2, since the current flowing through the MOS transistor M1 is excessive, the on voltage of the MOS transistor M1 is high, so that the potential of the high-level parts of the terminal voltage of the MOS transistor M1 is lower than that under the normal operation conditions as shown by the waveform (b). The terminal voltage of the MOS transistor M1 declining toward the right decreases to the reference potential of (Vcc−V1) at an early point of time as shown by the waveform (b). When the terminal voltage of the MOS transistor M1 is decreased to the reference potential as shown by the waveform (b), the differential amplifier 1 outputs a high level, and a high-level signal, or the overcurrent detection signal is output from the output of the AND circuit 5, or the output of the overload detecting circuit.

Then, by the overcurrent detection signal being input to the set input end of the first latch circuit 2, the latch circuit 2 is set, so that a high-level voltage is output from the Q output as shown by the waveform (c). During this high-level period of the Q output, or the period tc, the switching element 9 is conducting, and the charging operation of passing the charging current through the capacitor 11 from the constant current source 7 is performed. That is, as shown by the waveform (a), the charging operation is started in response to the first control signal generated after the overloaded condition arises, and the charging voltage of the capacitor 11 shown by the waveform (e) increases.

Then, when the second control signal is input, the latch circuit 2 is reset, so that the discharging operation of passing the discharging current through the capacitor 11 is performed and the discharging voltage of the capacitor 11 decreases as shown by the waveform (e) (period td). When the overload detecting circuit is actuated while the second control signal is being input, the latch circuit 2 is set again, and the charging operation is resumed, so that the charging voltage of the capacitor 11 further increases as shown by the waveform (e). The above-described operation is performed every time the control signal becomes high in the waveform (a), and the charging voltage shown by the waveform (e) increases every time.

At this time, by the Q output of the latch circuit 2 being input to the AND circuit 6, the width of the high-level period of the waveform (d) output from the output terminal of the AND circuit 6 is made smaller than the width of the high-level period of the control signal of the control signal generating circuit 16 shown by the waveform (a). Consequently, the on period of the MOS transistor M1 is decreased, so that the current flowing through the MOS transistor M1 is limited.

Then, when the charging voltage shown by the waveform (e) increases to reach the level of the second reference voltage of the reference voltage generator V2, the comparator 3 is actuated and outputs the time-up signal. The second latch circuit 4 is set by the time-up signal, the output signal of the AND circuit 6 is fixed at a low level as shown by the waveform (d), the switching element 17 operating on the output of the inverter circuit 14 is switched on, and the charges stored in the capacitor 11 are discharged so that the charging voltage is made zero.

With the operations performed up to this point, the detecting operation of detecting that the load current flowing through the MOS transistor M1 exceeds a predetermined current value is completed, and thereafter, the MOS transistor M1 continues to be off so that the MOS transistor M1 is shut off irrespective of the presence or absence of the control signal shown by the waveform (a).

In this manner, the maximum current value can be limited to not more than a predetermined value, and further, at the time of the occurrence of an abnormal current when the overloaded condition continues, the control of the MOS transistor M1 can be stopped. Consequently, the MOS transistor M1 and parts of the inductive load circuit such as the choke coil 29 can be protected against degradation and breakage with higher reliability.

However, with this structure, when the second latch circuit 4 is set, the MOS transistor M1 continues to be off. Consequently, the primary function of the switching power supply circuit is not restored unless the power supply voltage supplied to the entire switching power supply circuit is shut off. This problem can be solved by resetting the second latch circuit 4 by the output signal of the activating circuit 15.

Lastly, a method of effectively utilizing the activating circuit 15 will be described.

When the time from the start of the charging operation to the generation of the time-up signal in the timer circuit is the time-up period, by setting the period of generation of the output signal of the activating circuit 15 resetting the second latch circuit 4 to a period sufficiently longer than the time-up period, the following advantage is produced:

When an operator in charge of operating an electronic apparatus provided with the switching power supply circuit makes a mistake in the operation of the apparatus to short-circuit the inductive load circuit, not only the overloaded condition is detected and the MOS transistor M1 is shut off for protection but also the shut-off condition can be periodically canceled. Consequently, by the operator eliminating the short-circuited condition, the overcurrent detection operation for causing the protection operation to function is resumed and the primary function of the switching power supply circuit can be delivered.

What is claimed is:

1. A switching power supply circuit comprising:

a direct-current power source;

an inductive load circuit supplied with electric power from said direct-current power source;

a switching element interrupting the electric power supplied from said direct-current power source to said inductive load circuit;

a control signal generating circuit generating a control signal periodically bringing said switching element into conduction;

an overload detecting circuit generating an overload detection signal when a load current flowing through said switching element exceeds a predetermined current value;

a first latch circuit being set by the overload detection signal and being reset in response to a leading edge of the control signal;

a timer circuit performing a clocking operation during a period for which said first latch circuit is set, and generating a time-up signal when a predetermined clocking period elapses;

a second latch circuit being set in response to the time-up signal of said timer circuit; and an output drive circuit receiving as inputs the control signal and output signals of said first and said second latch circuits, bringing said switching element into conduction in response to the control signal under normal conditions, and shutting off said switching element irrespective of the control signal when at least one of said first and said second latch circuits is set.

2. A switching power supply circuit according to claim 1, wherein said overload detecting circuit compares an on voltage of said switching element with a predetermined first reference voltage in synchronism with switching on of said switching element to thereby detect that the load current flowing through said switching element exceeds the predetermined current value.

3. A switching power supply circuit according to claim 1, wherein said timer circuit comprises: a capacitor; charging means for passing a charging current through said capacitor during the period for which said first latch circuit is set; discharging means for passing a discharging current through said capacitor during a period for which said first latch circuit is reset; and a comparator comparing a charging voltage of said capacitor with a predetermined second reference voltage and outputting the time-up signal when the charging voltage of said capacitor exceeds the second reference voltage.

4. A switching power supply circuit according to claim 3, wherein in said timer circuit, a level of the second reference voltage is set so that a period from start of a charging and a discharging operation to generation of the time-up signal is not less than twice a period of the control signal.

5. A switching power supply circuit according to claim 3, wherein in said timer circuit, a level of the second reference voltage is set so that a period from start of a charging and a discharging operation to generation of the time-up signal is three to five times a period of the control signal.

6. A switching power supply circuit according to claim 3, comprising: an activating circuit a period of generation of which output signal is set to a period longer than a period of the control signal; and short-circuiting means for short-circuiting across said capacitor in response to the setting of said second latch circuit, wherein said second latch circuit is periodically reset by an activation signal of said activating circuit.

\* \* \* \* \*